United States Patent [19]

Shopalovich

[11] 3,741,479
[45] June 26, 1973

[54] DRIVE-OFF AID FOR WHEELED VEHICLES AND METHOD

[75] Inventor: Predrag Shopalovich, Ashland, Mass.

[73] Assignee: The United States of America as represented by the Secretary of the Army, Washington, D.C.

[22] Filed: Oct. 4, 1971

[21] Appl. No.: 186,339

[52] U.S. Cl. .................................. 238/14, 152/221
[51] Int. Cl. ............................................. E01b 23/00
[58] Field of Search ...................... 238/14; 152/208, 152/221, 223, 231

[56] References Cited
UNITED STATES PATENTS

| | | | |
|---|---|---|---|
| 1,229,901 | 6/1917 | Davis | 238/14 |
| 1,401,843 | 12/1921 | Weimar | 238/14 |
| 1,520,287 | 12/1924 | Fauth | 238/14 |

Primary Examiner—Gerald M. Forlenza
Assistant Examiner—Richard A. Bertsch
Attorney—Harry M. Saragovitz, Edward J. Kelby et al.

[57] ABSTRACT

A drive-off aid for removing a self-propelled wheeled vehicle under its own power from a position on an airdrop platform when shock absorbing material arranged between the vehicle and the platform prevents the tractive wheels of the vehicle from developing sufficient traction in contact with the platform surface to permit the vehicle to be driven off the platform, and the method for using same. The drive-off aid comprises a flexible ladder-like member having one end adapted for attachment to the end of the platform and the other end adapted for tractive engagement with the periphery of a tractive wheel of the vehicle in such a manner that rotation of the tractive wheel causes the ladder-like member to be wound upon the periphery thereof to thereby pull the vehicle off the shock absorbing matter by its own power.

4 Claims, 4 Drawing Figures

PATENTED JUN 26 1973
3,741,479
SHEET 1 OF 2
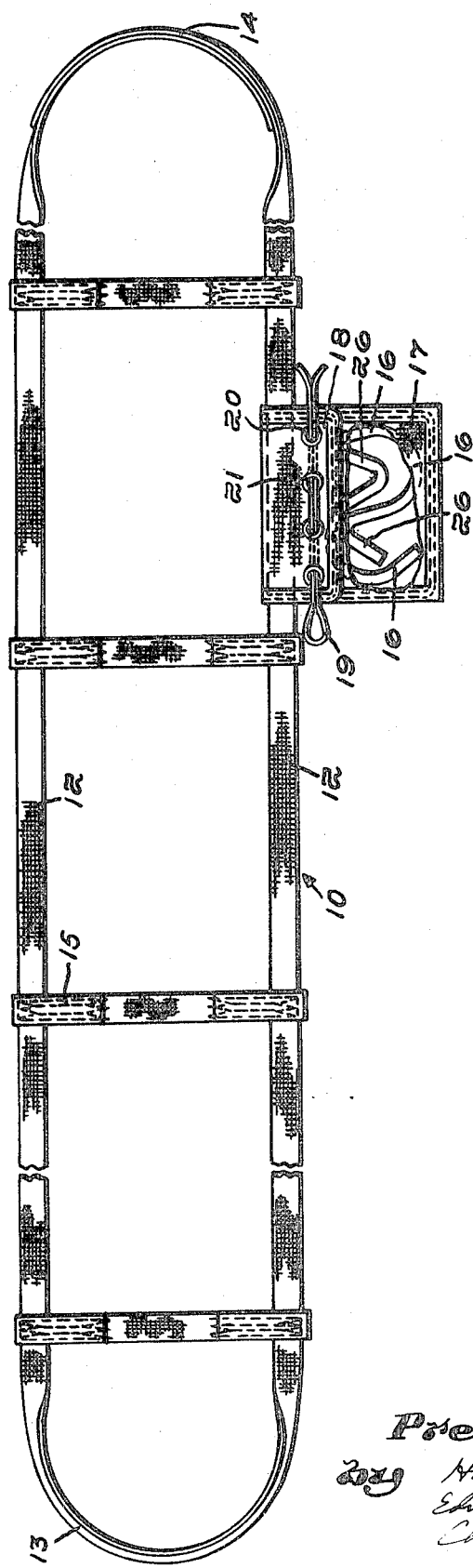
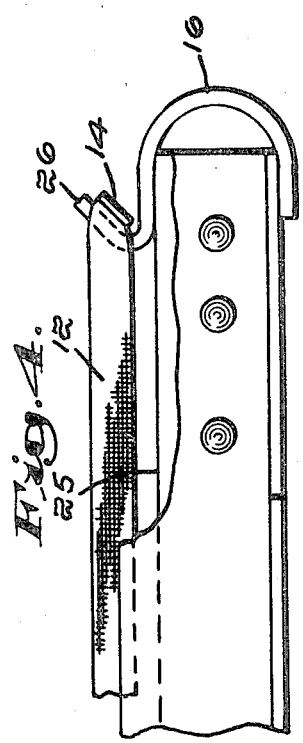
Inventor:
Predrag Shapalovich,
by Harry M. Saragovitz
Edward J. Kelly, Herbert Berl &
Charles Rainey
Attorneys

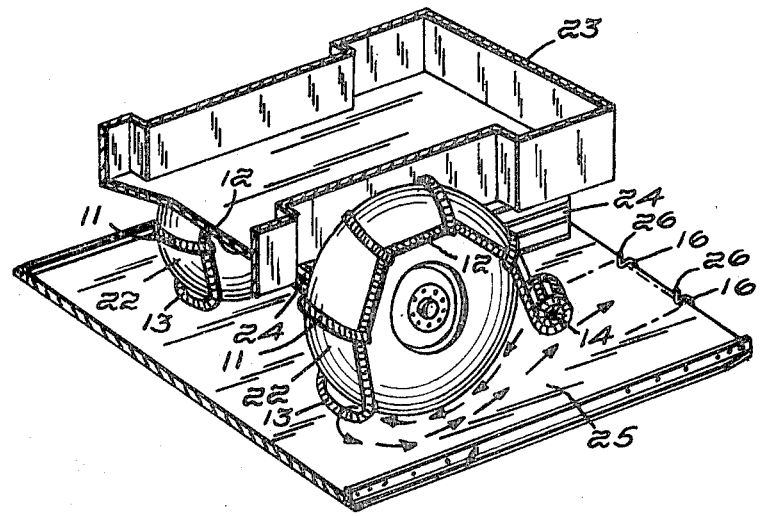
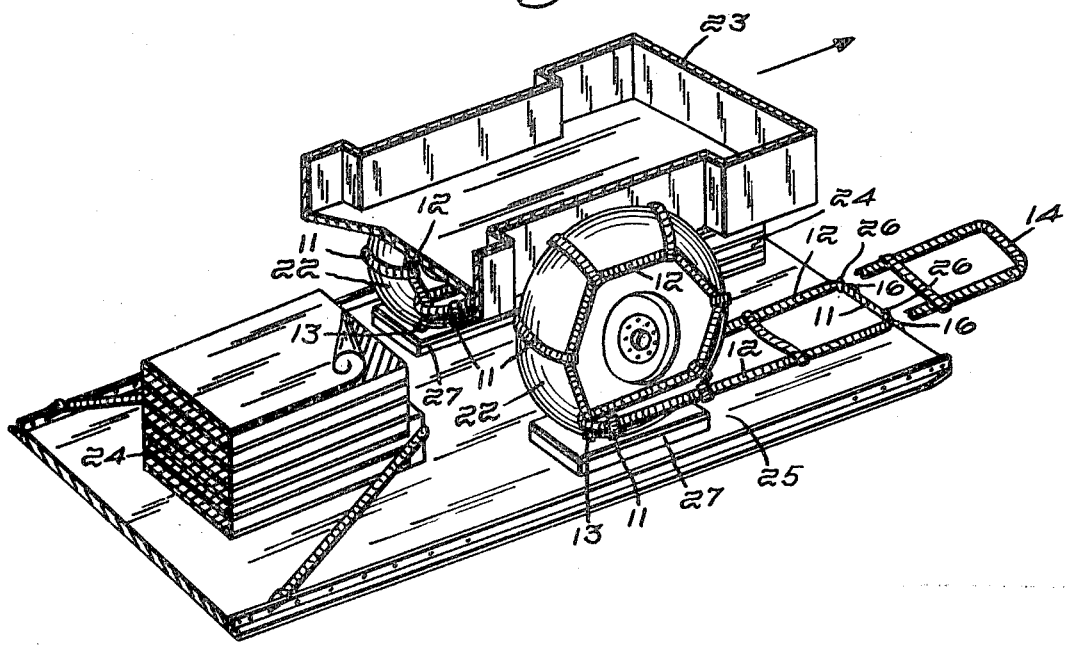

DRIVE-OFF AID FOR WHEELED VEHICLES AND METHOD

The invention described herein may be manufactured, used and licensed by or for the Government for governmental purposes without the payment to me of any royalty thereon.

This invention relates to a drive-off aid for a wheeled vehicle which is adapted for being loaded onto an airdrop platform and supported by stacks of crushable materials. More particularly, the invention relates to a device for application to one or more, but preferably two, tractive wheels of such a vehicle to provide means for enabling the vehicle to be driven off of the platform under its own power despite the hindrance of the stacks of crushable materials.

In the airdropping of equipment, it is necessary to protect the equipment against impacts which may damage critical elements thereof. For example, in the airdropping of trucks it has become customary to support the trucks on stacks of crushable materials resting on platforms, the amount of crushable material used being determined by the anticipated landing velocity of each platform and the weight of the trucks. Even when such a truck is actually airdropped, the crushable materials may not be crushed sufficiently to permit the tractive wheels of the truck to develop sufficient traction to permit the truck to be driven off of the airdrop platform under its own power. However, if under some circumstances a truck is not airdropped as planned, the cargo plane lands with the crushable material intact, thus necessitating removal of the truck from the stacks of crushable materials or removal of the stacks of crushable materials from beneath the trucks. Time may be critical in certain combat situations. Since the stacks of crushable materials constitute a serious obstacle to rapid unloading of the plane, a need has developed for an improved drive-off aid for trucks and other self-propelled wheeled vehicles to enable them to be driven off of airdrop platforms quickly under their own power.

It is an object of the present invention to provide an improved drive-off aid for a self-propelled wheeled vehicle which is adapted for being loaded on an airdrop platform and undergirded by stacks of crushable materials preventing the driving of the vehicle off of the platform under its own power in the absence of a drive-off aid.

The objects and advantages of the invention will become apparent from the following description of the invention, and the novel features will be particularly pointed out in connection with the appended claims.

In the accompanying drawings:

FIG. 1 is a plan view of the drive-off aid of the invention;

FIG. 2 is a perspective view of a broken away portion of a truck on an airdrop platform, the body of the truck being supported by stacks of crushable materials so that the tractive wheels are raised above the platform, the drive-off aid being in process of being applied to each of two tractive wheels of the truck;

FIG. 3 is a perspective view similar to that of FIG. 2, but showing the drive-off aid installed on each tractive wheel and ready for use whenever it is decided to drive the truck off of the platform under its own power; and FIG. 4 is a side view in elevation of a broken away portion of the drive-off aid and a hook of the type used to anchor the joint end of the drive-off aid to an end of the platform to enable the truck to be driven off of the platform under its own power, a broken away portion of the platform near the end over which the hook is hooked also being shown.

In the illustrated embodiment of the invention, the drive-off aid 10 is formed from a length of flexible material, such as textile webbing, in a substantially ladder-like form by joining the ends of the length of material together and attaching flexible cross members 11 to side members 12. The resulting ladder-like drive-off aid comprises two closed ends, a U-end 13 and a joint end 14, the U-end and the joint end being located at the opposite ends of the ladder-like drive-off aid. The joint end in the case of the use of webbing is formed by lapping the free end of one of the side members over the free end of the other side member and stitching or otherwise firmly attaching the overlapped ends of the side members together. The cross members are stitched in place to the side members by means of stitches 15.

It is necessary for the drive-off aid to be made so as to accomodate itself to and cooperate with the tractive wheel or wheels of a vehicle, which may vary in diameter and circumference of the periphery thereof. It has been found necessary that the drive-off aid have sufficient cross members and that these cross members be spaced apart sufficiently to provide a minimum of at least three cross members or the equivalent, the U-end being equivalent to a cross member when the drive-off aid has been installed on a wheel. The maximum spacing of the cross members will thus be about one third of the circumference of the periphery of the wheel. It is preferred that the width of the drive-off aid be great enough so that the drive-off aid will straddle the periphery of the tractive wheel with the side members overlying a portion of each of the sides of the wheels so as to stabilize the drive-off aid against slipping off of the wheel.

Each drive-off aid is provided with at least one but preferably a pair of hooks 16 for detachably anchoring the joint end of the drive-off aid to one end of an airdrop platform. A flexible pocket 17 is provided with each drive-off aid for storage of the hooks, as shown in FIG. 1, when the drive-off aid is not installed on a vehicle. Each pocket has a foldover flap 18 which is folded over one of the side members of the ladder-like member between two of the cross members when the drive-off aid is not in use. The flap may be held attached to the side member by means of a lace 19 which is laced through holes 20, reinforced by grommets 21, in the flap and similar holes and grommets (not shown) in the portions of the pocket overlain by the flap. Other means for keeping the flap closed to prevent loss of the hooks, such as snaps, zippers, "Velcro" closures, or the like may be employed instead of the lace, if desired. Further, other means for anchoring the drive-off aid may be employed and such anchoring means may be located at other points than an end of an airdrop platform; for example, the anchoring means may be located at a considerable distance from an airdrop or other platform or surface on which a vehicle equipped with the drive-off aid happens to be placed.

The installation of the drive-off aid is illustrated by FIGS. 2 thru 4. As shown therein, one of the drive-off aids is placed over a tractive wheel 22 of a truck 23 or other vehicle, the body and chassis of which is undergirded by stacks of crushable material 24, such as paperboard honeycomb, so that tractive wheels 22 are raised out of contact with the upper surface of airdrop platform 25. The drive-off aid may be placed over the tractive wheel with its U-end 13 in front of the tractive wheel or behind the tractive wheel, depending on the direction in which it is decided in advance to drive the truck off of the platform. If it is to be driven off the rear of the platform, the U-end is placed in front of the tractive wheel with the drive-off aid passing over the top of the tractive wheel, around the rear of the tractive wheel, beneath the tractive wheel, as indicated by the upper row of arrows in FIG. 2, through the U-end of the drive-off aid, then doubling back toward the rear of the tractive wheel and the rear of the platform to form a tight noose about the periphery of the wheel, as indicated by the lower row of arrows in FIG. 2 and as shown by the completed noose in FIG. 3, and finally looping either the joint end 14 or one of the cross members 11 about the upper ends 26 of two of the hooks 16 which have been previously removed from the flexible pocket 17 and hooked over the rear end of the airdrop platform 25. The same procedure is usually carried out with respect to the tractive wheel on the opposite side of the truck so that both tractive wheels will be provided with traction afforded by a drive-off aid in accordance with the invention. The tractive wheels may need to be rotated to some extent in a reverse direction in order to insure that the drive-off aid is under a slight tension during flight of the cargo aircraft in which the truck is airlifted. It may also be desirable to tape or otherwise temporarily fasten the joint end 14, or the cross member 11 which is looped about the upper ends 26 of the hooks, to the end of the platform to insure that the drive-off aid is at all times in an operable condition. If desired, a single layer 27 of crushable material or a short stack of layers of crushable material may be slid beneath each traction wheel after installation of the drive-off aid to provide additional protection against impact when the truck is airdropped.

When a drive-off aid has been installed on a pair of tractive wheels of a truck or other vehicle, as shown in FIGS. 2 thru 4, or even without the single layer or short stack of crushable material 27, and if or when it becomes desirable to drive the truck off of the airdrop platform under its own power, the truck motor is started and the driving mechanism is put in reverse, the tractive wheels being rotated in a reverse direction so as to back the truck off of the platform as indicated by the arrow in FIG. 3, the pair of drive-off aids being wound up on the peripheral surfaces of the tractive wheels, providing the necessary traction to enable the truck to overcome the restraint placed thereon by the stacks of crushable materials with which it is undergirded.

If it is decided in advance to drive the truck off of the front end of an airdrop platform, the procedure for installing the drive-off aids is altered from that described above, the U-end of each drive-off aid being placed behind a tractive wheel, the drive-off aid being passed over the tractive wheel toward the front thereof, thence around the front and under the tractive wheel, thence through the U-end of the drive-off aid, thence being doubled back toward the front of the tractive wheel and the front of the platform, the joint end 14 or a cross member 11 being looped about the upper ends 26 of a pair of hooks 16 which are hooked over the front end of the airdrop platform. In this case, when the truck is to be driven off of the platform under its own power, the driving mechanism of the truck is put in forward gear, the tractive wheels being rotated in the forward direction, and the truck being provided with sufficient traction by the drive-off aids to pull itself off of the front end of the airdrop platform despite the restraint or hindrance of the stacks of crushable materials used to undergird the truck for protection against impact during airdrop.

Although it is preferable to install a drive-off aid on each of a pair of tractive wheels on opposite sides of a vehicle, as described above and illustrated, it is possible under special circumstances to employ only one drive-off aid. In this case it is necessary to prevent turning of the vehicle due to the moment produced by the single drive-off aid. For example, if the tractive wheels on opposite sides of the vehicle are of the positive traction type and one of these tractive wheels on the opposite side of the vehicle from the wheel on which the drive-off aid has been installed is submerged in mud, the single drive-off aid may provide sufficient traction while the mud prevents turning of the vehicle, which would tend to occur in the absence of the mud or some mechanical device designed to prevent such turning.

Although, as described above, it is preferable to anchor the joint end of the drive-off aid to an end of an airdrop platform, it is to be understood that the anchoring thereof may occur at any point spaced from the wheel in the direction in which the vehicle is to be moved. The point or points of anchoring of the drive-off aid will generally lie in a plane which is perpendicular to each of the two parallel planes in which the two sides of the tractive wheel lie.

While the invention has been described in terms of a flexible ladderlike drive-off aid made of webbing, it is to be understood that other flexible materials may be used, provided they have sufficient strength to withstand the large forces which must be applied thereto in order to pull a heavy truck or other vehicle off of stacks of crushable materials under its own power. Such materials may include ropes of various kinds made of nylon or other strong synthetic fibers or of natural fibers such as sisal. It is also to be understood that in some instances, especially in cases of small lightweight vehicles, the side members and/or the cross members of the drive-off aids of the invention may be made of polymeric tapes, that is relatively narrow and long strips of polymeric films. In such cases, the joints, both at the joint end and at the ends of the cross members where they are joined to the side members may be formed by heat sealing or by means of adhesives or even by riveting, care being taken to provide sufficient strength at or along such joints to avoid rupture during the removal of a vehicle from an airdrop platform.

The drive-off aid of the invention may be constructed of webbing made from a wide variety of fibers, the main requirement being that the fibers used possess sufficient tensile strength that the drive-off aids do not have to be made so bulky as to be impractical to install on the vehicle tractive wheels. Naturally, the weaker the fibers or yarns from which the webbing is made, the more bulky the drive-off aid would need to be, especially for large and heavy vehicles. With the relatively rapid reduction in costs of producing polyester fibers, it appears quite likely that webbings made from polyester yarns or blends thereof with cotton or nylon may become especially useful materials for making drive-off aids in accordance with the invention.

The drive-off aid of the invention can be made of sufficient length and width to be usable with a wide range of wheel sizes. As shown in FIG. 3, the illustrated drive-off aid would be long enough to be used with an appreciably larger tractive wheel than that illustrated. Similarly, it could be used with a still smaller tractive wheel, th excess length simply extending beyond the cross member which is hooked over hooks 16, or being taped to the end of the platform. This provides a distinct advantage in the drive-off aid of the present invention over the use of wheel capstans which have been used to some extent in the past for somewhat related purposes since a different capstan is usually required for each size or type of vehicle because of inherent differences in the sizes of the wheel hubs or the numbers and spacings of the wheel lugs whereby the capstans are usually attached to the tractive wheels when the wheel capstans of the prior art are employed in moving vehicles under their own power when insufficient traction is available in the absence of such drive-off or pulling aids.

The drive-off aid of the present invention is very useful in making it possible for a truck or other self-propelled wheeled vehicle having tractive wheels to drive off of any surface on which it is placed under such circumstances that the tractive wheels cannot develop traction sufficient to overcome some restraint of appreciable magnitude which, however, is insufficient to withstand the forces developed by the power source of the vehicle when the tractive wheels are able to develop good traction. The drive-off aid produces the traction necessary for the vehicle to pull itself off of the surface on which it happens to be located. In the case of a heavy vehicle prepared for airdropping, the savings in time and labor required in removing such a vehicle from stacks of crushable materials and from an airdrop platform are large. In some operational situations involving the Armed Forces these savings in time and labor may spell the difference between success and failure of a crucial military operation.

It will be understood that various changes in the details, materials and arrangements of parts which have been herein described and illustrated in order to explain of the invention, may be made by those skilled in the art within the principle and scope of the invention.

I claim:

1. A drive-off aid for removing a self-propelled wheeled vehicle having at least one tractive wheel under its own power from a position on an airdrop platform when shock absorbing material arranged between the vehicle and the platform prevents the tractive wheels of the vehicle from developing sufficient traction in contact with the platform to permit the vehicle to be driven off the platform, said drive-off aid comprising a flexible ladder-like member having the free ends of the side members thereof fixedly joined together to form a closed loop at each end of said ladder-like member and means for anchoring one end portion of said ladder-like member at a point spaced from said wheel in the direction in which the vehicle is to be moved, the other end portion of said ladder-like member being adapted to be looped around the periphery of said tractive wheel with said end portion to be anchored passed through said closed loop of said other end portion to form a traction producing noose about said tractive wheel with the cross members of said ladder-like member straddling the periphery of said wheel, whereby rotation of said tractive wheel in the direction in which said vehicle is to be moved causes said ladder-like member to be wound upon the periphery of said tractive wheel to thereby move said vehicle toward said anchoring point under its own power.

2. A drive-off aid in accordance with claim 1, wherein said anchoring means comprises at least one hook member adapted to engage said end portion of said ladder-like member to be anchored and the end of said airdrop platform.

3. A drive-off aid in accordance with claim 1, wherein said flexible ladder-like member comprises side members and cross members made of flexible webbing.

4. A method of removing a self-propelled wheeled vehicle having at least one tractive wheel under its own power from a position on an airdrop platform when shock absorbing material arranged between the vehicle and the platform prevents the tractive wheels of the vehicle from developing sufficient traction in contact with the platform surface to permit the vehicle to be driven off the platform, comprising looping a flexible ladder-like member around the periphery of said tractive wheel to form a traction-producing noose about said tractive wheel, said ladder-like member having the free ends of the side members thereof fixedly joined together to form a closed loop at each end of said ladder-like member, anchoring one end portion of said ladder-like member at a point spaced from said wheel in the direction in which the vehicle is to be moved, said noose being formed by placing said ladder-like member over said tractive wheel with the closed end of the other end portion of said ladder-like member straddling the portion of the periphery of said tractive wheel disposed farthest from said anchoring point, passing said other end portion of said ladder-like member over the upper portion of said periphery of said tractive wheel and around said tractive wheel, said ladder-like member straddling said periphery, passing said one end portion of said ladder-like member to be anchored through the closed end of said other end portion, doubling said end portion to be anchored and portions of said ladder-like member adjacent thereto back toward said anchoring point, completing the anchoring of said end portion to be anchored to anchoring means located at said anchoring point, and rotating said tractive wheel in the direction of said anchoring point, thereby winding said ladder-like member upon the periphery of said tractive wheel, whereby said vehicle is moved toward said anchoring point under its own power.

* * * * *